Aug. 6, 1935.  E. T. CONDON  2,010,138
LIGHTING, SIGNALING AND INDICATING ACCESSORY FOR MOTOR VEHICLES
Filed Nov. 12, 1931  2 Sheets-Sheet 1
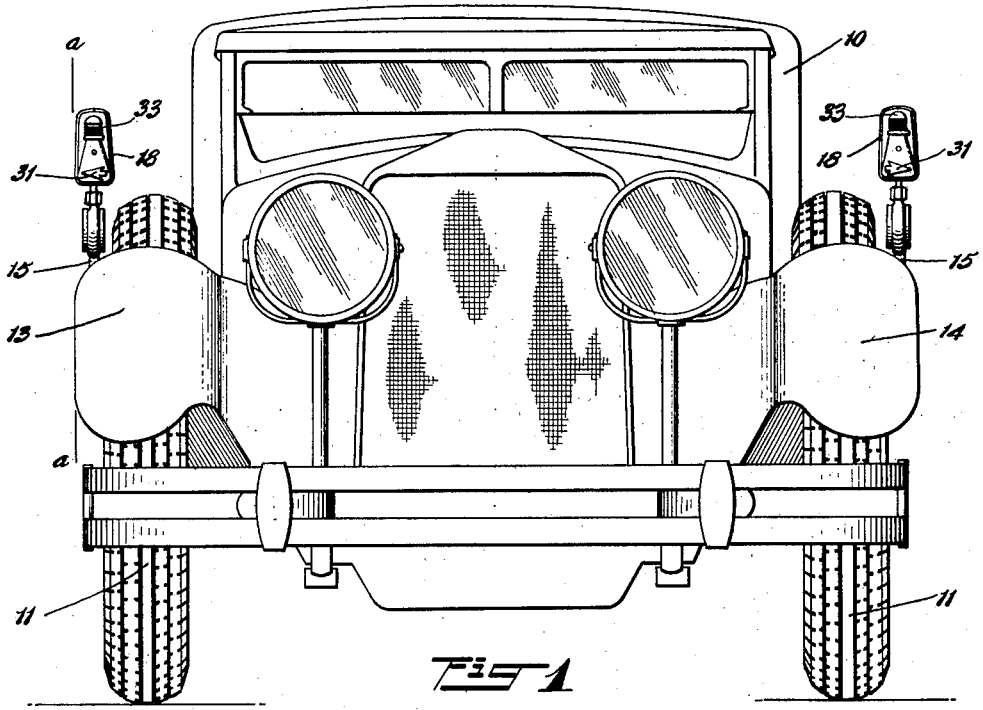
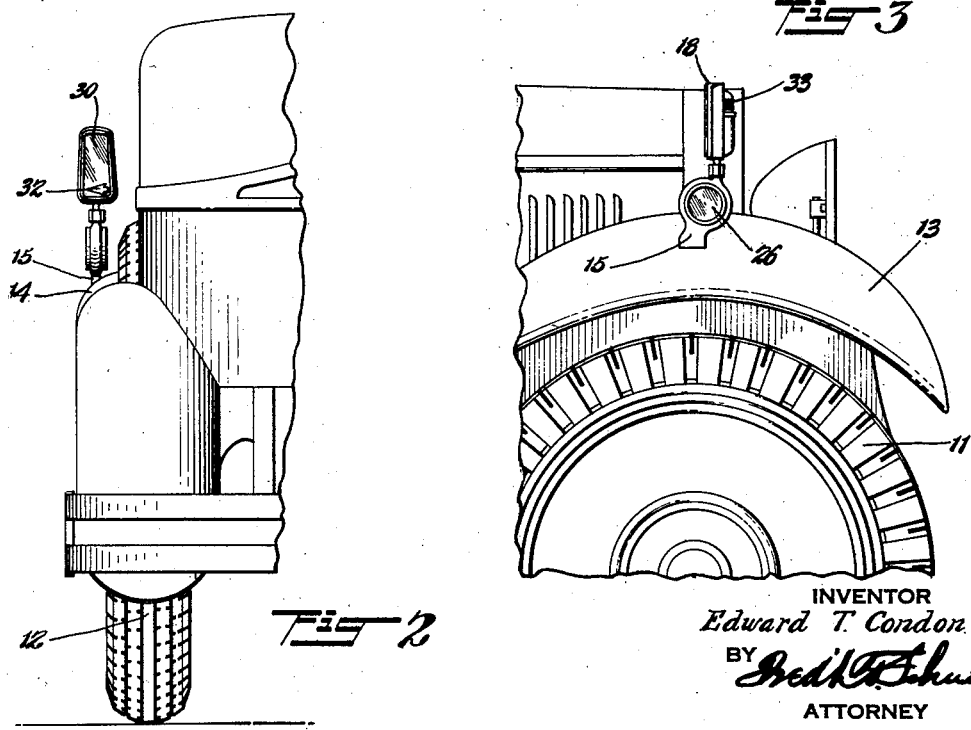
INVENTOR
Edward T. Condon
BY
ATTORNEY

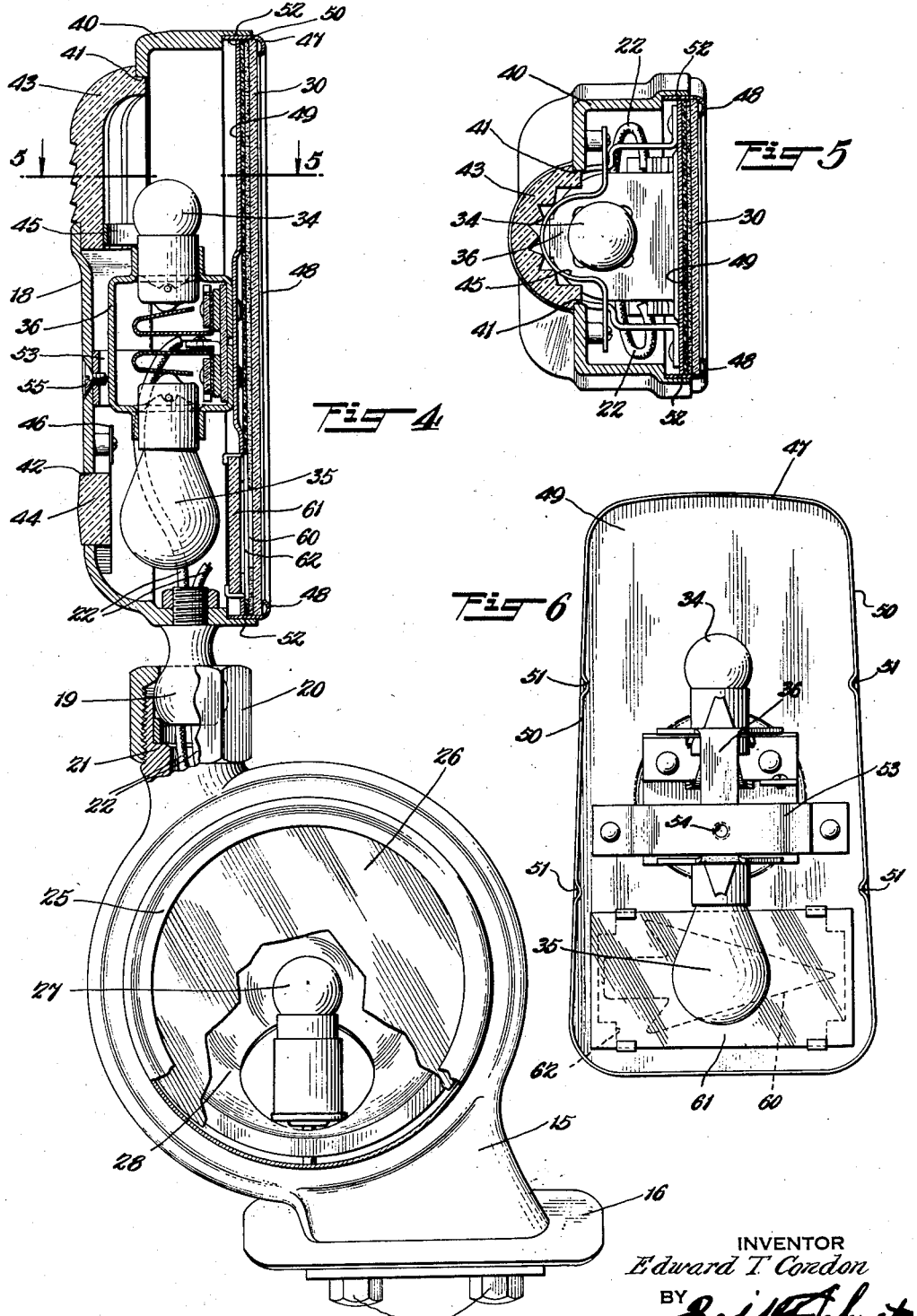

Patented Aug. 6, 1935

2,010,138

UNITED STATES PATENT OFFICE 2,010,138

LIGHTING, SIGNALING, AND INDICATING ACCESSORY FOR MOTOR VEHICLES

Edward T. Condon, New York, N. Y., assignor to Autoposts Company Inc., New York, N. Y., a corporation of New York Application November 12, 1931, Serial No. 574,619

3 Claims. (Cl. 177—329)

The invention relates to automobile accessories, more especially to a lighting, signaling and indicating device adapted to be carried upon a fender or mudguard of a motor vehicle.

It has for an object to so construct and arrange the device that the same may serve not only to afford the desired signal and/or parking or driving light, but will afford a fender guide or indicator assisting the operator of the car in parking or in maneuvering the car through traffic.

A further object of the invention resides in the provision of a carrying bracket or the like for the device whereby the same may be adjusted to the desired position.

A still further object of the invention resides in the provision of means included in the bracket intermediate said device and bracket-attaching means whereby a beam of light may be projected laterally of the vehicle.

Another object of the invention resides in the provision of a rear-view mirror having a signal portion to give notice to a following vehicle of the operator's intention to make a turn; and simultaneously therewith to afford also a similar signal to an approaching vehicle.

A still further object of the invention resides in the provision of an additional light in the device suitable for parking purposes or as a driving light.

In carrying out the invention, an elongated mirror is arranged to close the rear opening of a housing provided with transparent apertures, the mirror being backed by a suitable plate and both held within a carrying frame. Between the mirror with plate and the forward wall of the casing are located two lamps, independently operable, and positioned respectively opposite the two apertures of the casing, the mirror and plate screening the upper lamp while the lower one is arranged to be visible through a registering aperture of the plate and transparent portion of the mirror.

The mirror is so located as to operate as a rear view mirror, and when the one light is flashed on, a signal to a following vehicle as well as to an approaching one will be given. When the other lamp is energized, merely a parking or driving light will be had which is not visible from the rear of the device in that it is screened by the plate and mirror.

In order to suitably carry and to attach the device to the fender of the vehicle, a bracket is provided having means at its lower end for attachment to the fender top and at its upper end being provided with a universal joint or the like for attachment of the device thereto, the same being locked in position relatively to the bracket through a nut or the like when the desired adjustment has been attained. Furthermore, the bracket is so positioned with respect to the top of the fender that the far or outer side edge of the device will lie substantially in the plane of the wing of said fender and is elevated sufficiently above the top of the fender to render said edge visible to the operator of the vehicle.

Between the universal joint and the lower attaching means of the bracket, also, an opening is provided in the said bracket to receive a lens behind which is located a further lamp, independently operable of the other lamps, said lamp having reflecting means behind the same whereby a beam of light may be projected laterally of the vehicle when the said lamp is energized.

The nature of the invention, however, will best be understood when described in connection with the accompanying drawings, in which:

Fig. 1 is a front view of a self-propelled vehicle, as an automobile, showing a pair of the lighting and indicating members installed on the forward fenders of the vehicle.

Fig. 2 is a fragmentary rear view of the vehicle, and Fig. 3 is a similar side view, and equipped with the members.

Fig. 4 is a side elevation of the novel device with portions broken away and portion in vertical section.

Fig. 5 is a horizontal section taken on the line 5—5, Fig. 4, and looking in the direction of the arrows.

Fig. 6 is a plan view of the closing frame and plate for the housing and lamps carried thereby.

Referring to the drawings, 10 designates a motor vehicle having the forward wheels 11 and rear wheels 12 with corresponding pair of forward fenders 13 and 14. To the top of these fenders is arranged to be attached a carrying bracket 15, as through the bottom plate 16 of the bracket and bolts 17 whereby a said bracket will be rigidly mounted upon its fender. This bracket, furthermore, is designed to adjustably support an elongated illumination and signal element 18, for example, through a universal joint 19 which may be tightened by taking up on the clamping nut 20 mounted thereover. The joint includes a hollow post member 21 for receiving conductors 22 of the element 18, the same passing also through the bracket 15 and eventually through the fender to which it is attached, and as is well understood. By means of the universal joint 19 and clamping nut 20, it is possible to adjust the element 18 to the desired position with respect to the operator of the vehicle; and in accordance with the invention, this element is further so located with reference to the fender carrying same and the bracket is so designed that not only will the element extend appreciably above the fender to render it visible to the operator of the vehicle, but its outer side edge is arranged to lie substantially in the plane a—a of the wing of the fender. It will thus afford a fender guide or indicator to assist the operator of the car in parking the same or in maneuvering the car through traffic.

Between said element and the attaching means of its bracket, there is also arranged a light-beam directing element by which a beam of light may be directed more or less laterally of the vehicle. For example, the bracket may have an enlarged circular opening portion 25 in which is mounted a lens 26 having behind the same a lamp 27 and backed by a reflector 28. Lamp 27 is arranged to be energized in any well-known or special manner from a point convenient to the operator of the vehicle and a beam of light may thus be projected from the bracket when desired.

The element 18 affords, also, a rear view driving mirror 30 as well as forward and rearward companion turning signals 31 and 32, respectively, and a parking or driving light 33, the said signals being independently operable, as is well understood, from a point convenient to the operator of the vehicle. Thus the pair of lamps 34 and 35 may be provided to afford the illumination when desired, the same being retained in a twin-socket fixture 36 of the element.

This element is shown more particularly in Figs. 4–6. Referring to these figures, the element is shown to comprise a housing 40 open at the rear and provided with upper and lower apertures 41 and 42, respectively in its forward wall. Transparent elements such as the transparent or translucent lenses or glass plates 43 and 44, respectively, may be arranged to close these apertures and suitable means are provided to hold the same thereto. For example, a strap 45 secured to the forward wall may serve to hold the former in position, while washers 46 serve to hold the other member in position. The rear of the housing is designed to be closed by the mirror 30 which is retained by a suitable frame 47 having the inturned flanged edges 48 for setting the mirror, the mirror being held thereto by means of a backing plate 49 which is retained in the flexible side walls 50 of the frame as by the lateral indentations 51 thereof.

Frame 47 is arranged to frictionally fit within the side walls 52 of the housing, thereby also serving to press inwardly the side walls 50 with indentations 51 of the frame 47. To rigidly hold the backing plate and mirror in position and obviate rattling of the same when the vehicle is operated and to further secure the frame with mirror and plate to the casing 40, a transverse strap 53 is secured to the plate 49 and is tapped as at 54 to receive a screw 55 passing through the forward wall of housing 40.

The mirror 30 at its lower portion is provided with transparent portions or an aperture having the desired configuration, for example as the arrow 60 which may be backed by a piece of colored glass 61 held to the plate 49 to cover an opening 62 therein. Lamp 35 is located in juxtaposition to this opening and the transparent or translucent portion of the mirror so that when the lamp is illuminated the signal will be flashed through the mirror giving notice to a vehicle following the one equipped with the signal device of the operator's intention to make a turn in the direction indicated. A similar signal will simultaneously be given through the aperture and lens 44 to an approaching vehicle or an officer on duty at the point where the turn is desired to be made. The upper lamp 34, being independently operable, will not be illuminated with the giving of the forward and rearward signals aforesaid, and may be used either as a parking light or driving light when desired, no rearward indication being given of the light through the blocking of the same by the plate 49 and/or mirror 30. Furthermore, if desired and to more readily distinguish the signal lights thus afforded, a flasher element of well known or special design (not shown) may be included in the circuit to the lamp 35 to intermittently energize the same, as is well understood.

By the arrangement hereinbefore described, the signal element is readily separable for replacement of the burned out or defective lamp, and the same may also be inexpensively manufactured and conveniently assembled. Furthermore, it affords not only the desired signals and parking lights and a rear view mirror as well, but through the particular mounting and arrangement on the fender provides a guide for assisting the operator of the car in parking or maneuvering the same.

I claim:

1. A two-part separable device of the character set forth, comprising a housing open at the rear portion and provided with upper and lower apertures in its forward wall, transparent elements over the respective apertures and means to hold the same to the forward wall, a closing plate for the rear portion of the said housing and provided with a lower opening, a frame surrounding the plate adapted to be frictionally held within the sides of the housing and having inturned flanged edges, a mirror seated on the flanged edges, backed by the plate and held thereto by indentations of the said frame, the said mirror having a transparent signal portion registering with the plate opening and lying opposite the said lower aperture of the housing, and a pair of lamps carried by the plate, the one opposite the opening therein and the other opposite the other aperture of the housing.

2. A two-part separable device of the character set forth, comprising a housing open at the rear portion and provided with upper and lower apertures in its forward wall, transparent elements over the respective apertures and means to hold the same to the forward wall, a closing plate for the rear portion of the said housing and provided with a lower opening, a frame surrounding the plate adapted to be frictionally held within the sides of the housing and having inturned flanged edges, a mirror seated on the flanged edges and backed by the plate, means retaining the mirror-backing plate to the frame, the said mirror having a transparent signal portion registering with the plate opening and lying opposite the said lower aperture of the housing, and a pair of lamps carried by the plate, the one opposite the opening therein and the other opposite the other aperture of the housing.

3. A fixture for attachment to the fender of a motor vehicle, comprising a foot-piece for securing the fixture in position on the fender, an upper portion positioned by the foot-piece in a plane at right angles to the longitudinal axis of the motor vehicle when the foot-piece is secured to its fender, and rear of said upper portion having a mirror-receiving opening and the front being provided with a lamp-receiving chamber, and a narrow intermediate portion presented edgewise with respect to the upper portion and lying in a plane parallel to the longitudinal axis of the motor vehicle, said intermediate portion affording an opening therethrough, a lens retained therein and closing the said opening at its outer side, and a lamp also retained in said opening at the intermediate portion behind the lens thereof.

EDWARD T. CONDON.